No. 709,347. Patented Sept. 16, 1902.
J. MOREHEAD.
STEAM TRAP.
(Application filed Sept. 17, 1900.)
(No Model.) 4 Sheets—Sheet 1.
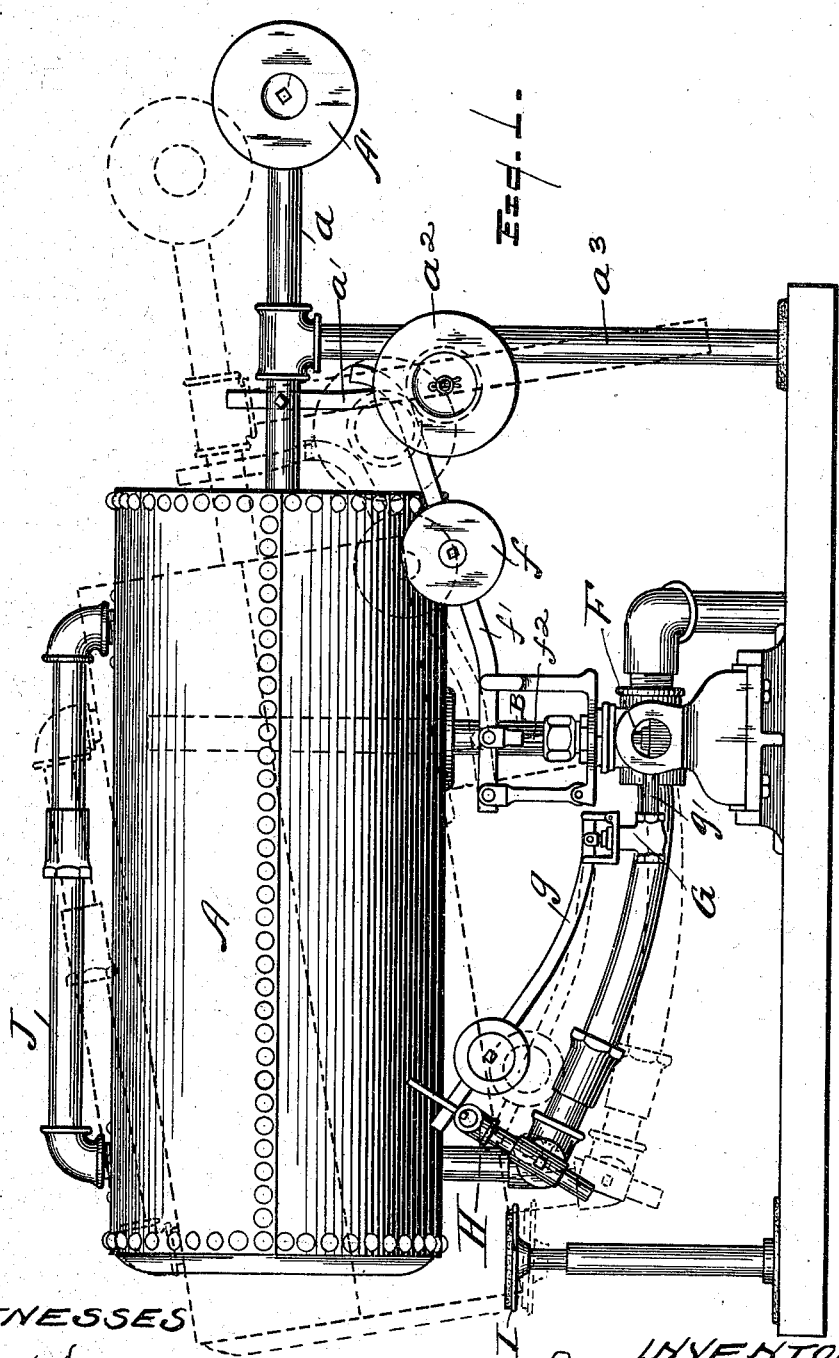
WITNESSES
INVENTOR
John Morehead
By Fisk & Thomas
Attorneys

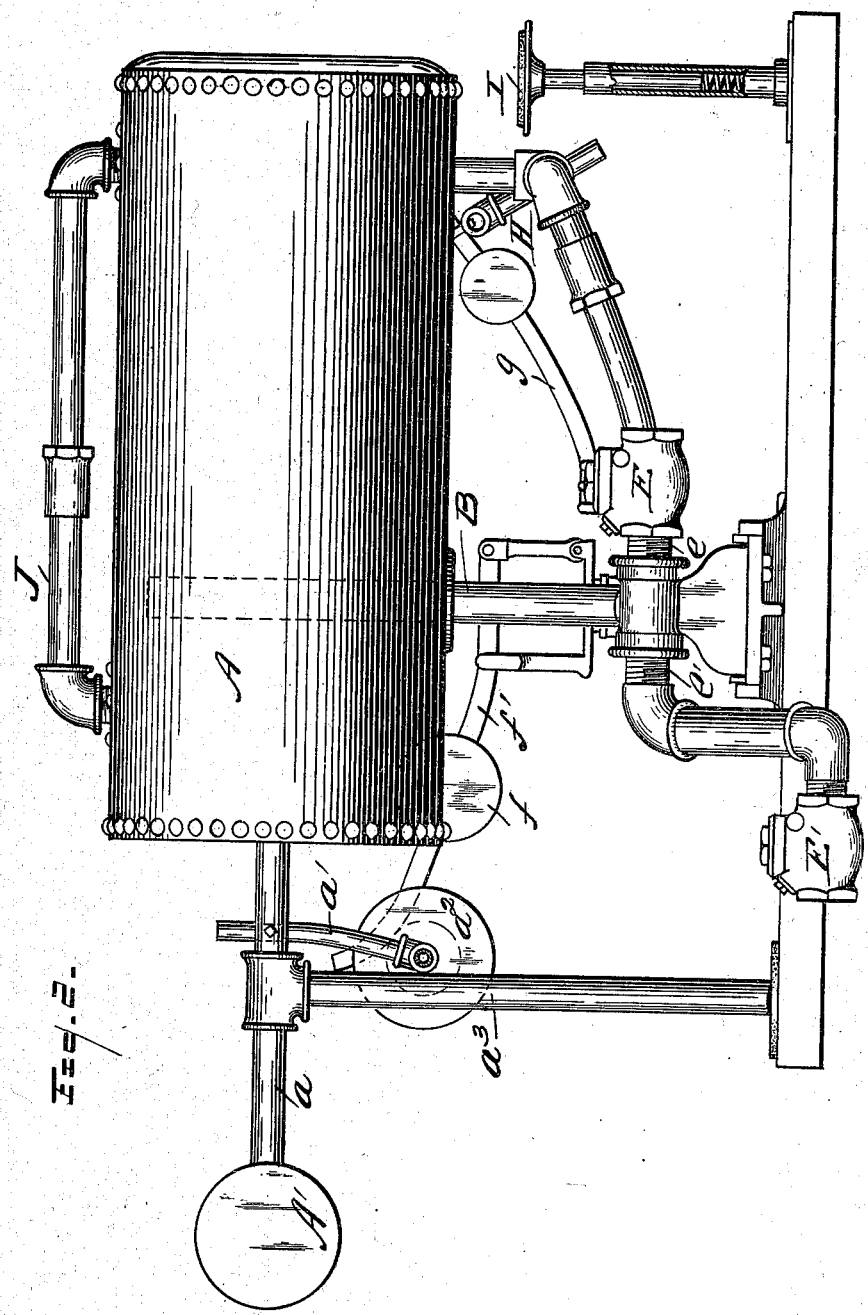

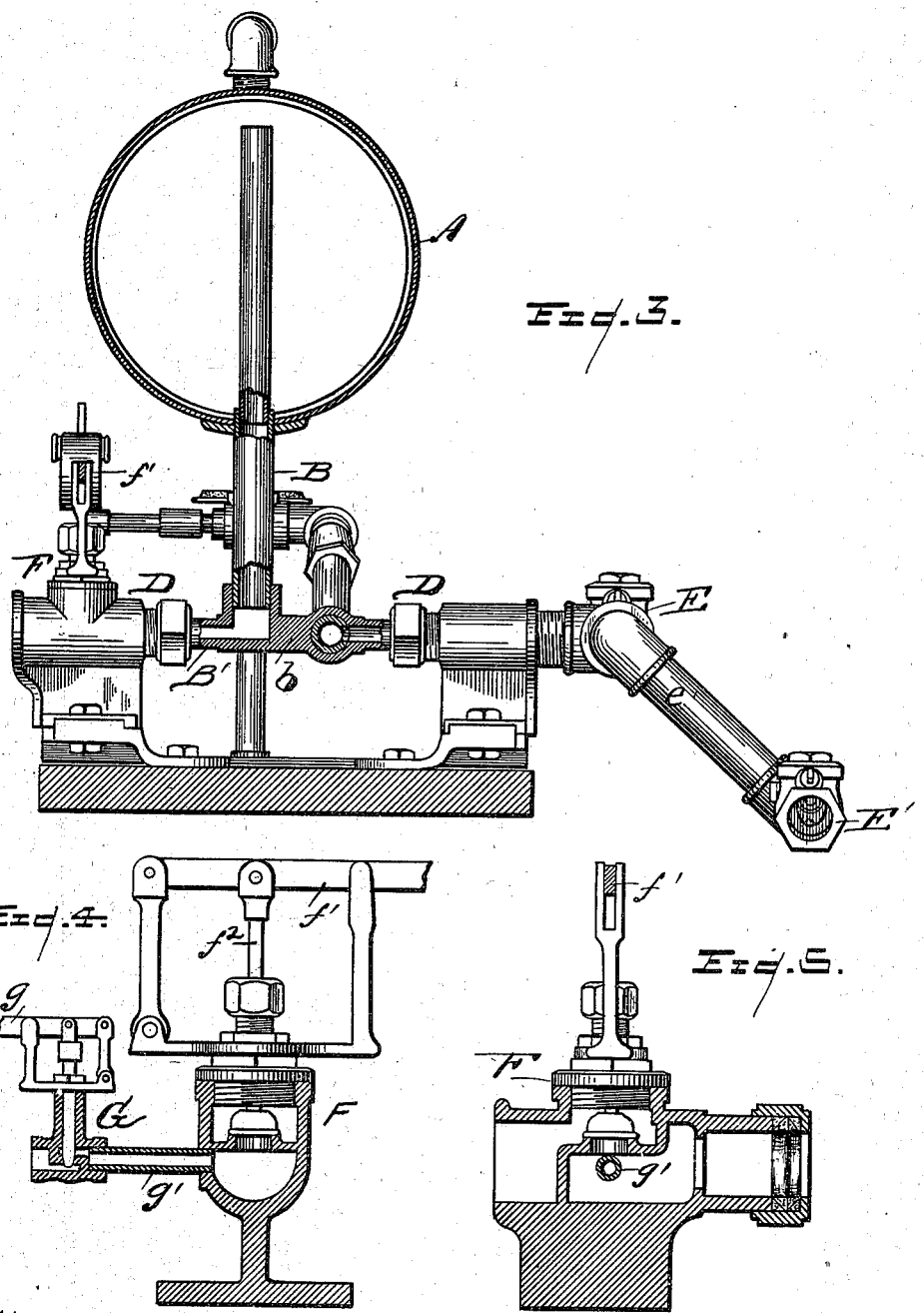

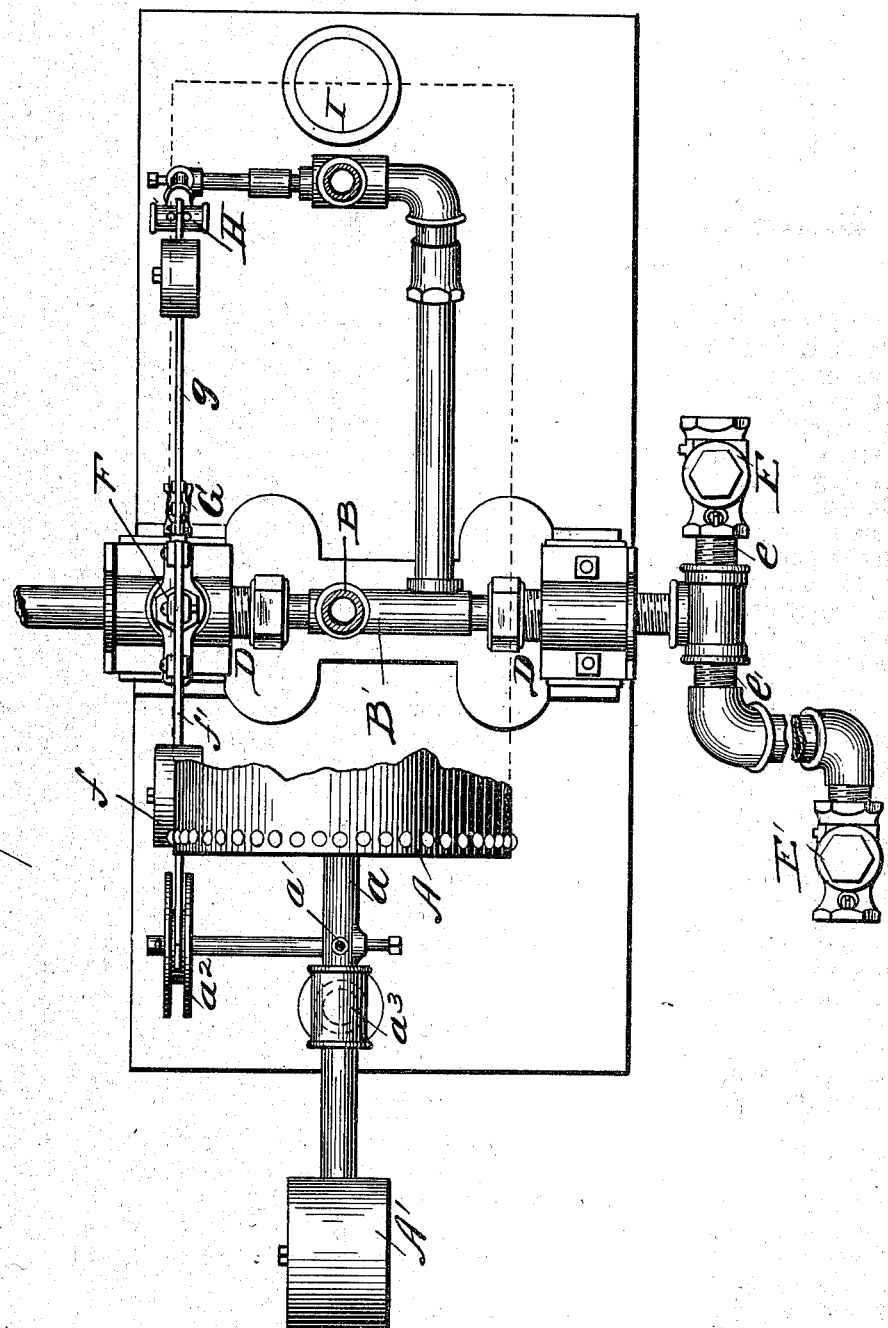

UNITED STATES PATENT OFFICE.

JOHN MOREHEAD, OF DETROIT, MICHIGAN.

STEAM-TRAP.

SPECIFICATION forming part of Letters Patent No. 709,347, dated September 16, 1902.

Application filed September 17, 1900. Serial No. 30,312. (No model.)

*To all whom it may concern:*

Be it known that I, JOHN MOREHEAD, a citizen of the United States, residing at Detroit, county of Wayne, State of Michigan, have invented a certain new and useful Improvement in Steam-Traps; and I declare the following to be a full, clear, and exact description of the invention, such as will enable others skilled in the art to which it pertains to make and use the same, reference being had to the accompanying drawings, which form a part of this specification.

My invention has for its object an improvement in steam-traps designed to relieve steam-pipes of the water of condensation and return the same to the boiler, the construction and operation being more simple and effective than apparatus of a like character now in use.

Referring to the drawings forming a part of this specification, Figure 1 is a side elevation showing the position of the trap when receiving the water of condensation from the pipes and in dotted lines its position and that of the operating parts when the water is being discharged into the boiler. Fig. 2 is a side elevation opposite that shown in Fig. 1. Fig. 3 is a cross-sectional view of the trap, showing more particularly the steam-inlet into the receiving-chamber. Fig. 4 is a cross-sectional view of the steam-inlet valve and in connection therewith the air-relief valve. Fig. 5 is a longitudinal sectional view of the steam-inlet valve shown in Fig. 4. Fig. 6 is a plan view, a portion of the receiving-chamber being broken away to show the arrangement of the piping below.

Referring to the letters of reference shown on the drawings, A represents the receiving-chamber of the trap, preferably constructed of boiler-iron and supported by the steam-pipe B at one side of its center of gravity.

B' is a horizontal pipe from which the pipe B rises and which serves as trunnions for the receiving-chamber that it may tilt when the weight of the water of condensation in said chamber overcomes the action of the adjustable weight arranged to keep it at a horizontal position to receive the water.

D D are bearings in which the pipe B' is mounted. The pipe B' is divided by wall $b$, one end serving as a steam-inlet and the other end as a connection between the receiving-chamber A and the pipe for returning the water of condensation to the trap and the pipe leading the water from the trap to the boiler, there being a slip-joint connection between the pipe B' and the pipes joining it.

E is a check-valve located in the return-pipe $e$, through which the water of condensation is allowed to pass freely when the receiving-chamber A is in a horizontal position. E' is a similar check-valve located in the pipe $e'$, leading from the trap to the boiler and held closed by the boiler-pressure until steam is admitted into the receiving-chamber A. The steam-inlet valve F, located in the pipe leading from the boiler and communicating with the pipe B' and upright pipe B, is held closed normally by the action of the weight $f$, adjustably mounted on the pivoted arm $f'$, adapted to bear upon the valve-stem $f^2$.

Projecting from the end of the receiving-chamber A is an arm $a$, upon which is mounted an adjustable weight A', adapted to maintain the chamber in a horizontal position until the volume of water in the receiving-chamber assumes such proportion that it will overcome the action of the weight A' and cause the chamber to tilt, as shown by the dotted lines in Fig. 1. Adjustably secured to the arm $a$ is a leg $a'$, upon which is mounted a flange-roll $a^2$, adapted to receive within its flanges the arm $f'$. Secured to the arm $a$ is a depending leg $a^3$, designed to limit the movement of the tilting chamber A when being returned to its normal position by the action of the weight A'.

G is an air-relief valve controlled by the weighted arm $g$, located in the pipes $g'$, leading into the body of the steam-valve F.

H is an adjustable guide and stop secured to the tilting chamber A and adapted to receive and control the action of the weighted arm $g$, governing the valve G.

I is a buffer adapted to receive the impact of the receiving-chamber A when it is tilted by the weight of water contained therein.

J is a pipe located above and opening into the receiving-chamber at each end. The upright steam-pipe B is carried up to within a short distance of the top of the receiving-chamber to insure the delivery of steam on the surface of the water of condensation in the receiving-chamber. The pipe J is designed to assist in insuring steam-space above the water in the chamber A at all times.

I will now explain the operation of the apparatus. The trap is located at some convenient point above the water-line in the boiler. The water of condensation being conducted by return-piping to the trap passes through the check-valve E and enters the receiving-chamber A of the trap. When the volume of water in the receiving-chamber reaches such proportion that it overcomes the action of the adjustable weight A', the receiving-chamber tilts, coming in contact with the buffer I, which takes up the jar. The action of tilting causes the water in the end of the chamber A nearest the adjustable weight A' to rush to the opposite end of the chamber, thereby assisting in maintaining the chamber in its tilted position until sufficiently relieved of the water therein contained. The action of the chamber in tilting causes the steam-valve F to open through the lifting of the arm controlling same, while at the same moment the air-relief valve is closed by the action of the weighted arm governing it. The admission of steam from the boiler through the valve F onto the water in the chamber A drives the water therefrom out through the check-valve E' back to the boiler, the check-valve E being held closed by the pressure back of it while the receiving-chamber A is in a tilted position. When the receiving-chamber is sufficiently free from the water of condensation, the action of the weight A' will return it to its normal position, its reverse movement closing the steam-valve F and opening the relief-valve E, as will be readily understood.

I have shown in the drawings one of the bearings D as an integral portion of the steam-valve casing. It may, if desired, be an independent bearing.

What I claim is—

1. In a steam-trap, the combination of a tilting receiving-chamber, a suitably-supported transverse rocking pipe having a closed partition to divide its length, a steam-pipe leading from one section of said transverse pipe into the receiving-chamber, a valve to control the admission of steam governed by the tilting of said chamber, a pipe leading from the opposite section of said transverse pipe into the receiving-chamber, a cross-pipe for conducting the water of condensation communicating with one end of the transverse pipe, and check-valves located in said cross-pipe, one on each side of the junction of the transverse and cross pipes, whereby the water of condensation may be admitted to, and discharged from the receiving-chamber through the section of the transverse rocking pipe opposite that through which steam is admitted to the receiving-chamber, as the position of the tilting chamber will determine, substantially as described.

2. In a steam-trap, the combination with a receiving-chamber, a water inlet and discharge pipe suitably controlled, a steam-inlet pipe communicating with the interior and discharging near the top of the receiving-chamber, a valve for controlling the admission of steam to said pipe, an air-relief valve communicating with said steam-inlet pipe, and means for automatically opening the steam-inlet valve and closing the air-relief valve by the tilting of the receiving-chamber in one direction and for closing the steam-valve, and opening the air-relief valve when the chamber is tilted in the opposite direction, substantially as described.

3. In a steam-trap, a tilting receiving-chamber, pipes for admitting and discharging the water from the receiving-chamber suitably controlled, a steam-inlet pipe having its point of discharge in the receiving-chamber and near its top, and a pipe or steam-space located above said receiving-chamber and communicating with the interior at or near both ends of the chamber substantially as described.

In testimony whereof I sign this specification in the presence of two witnesses.

JOHN MOREHEAD.

Witnesses:
FRANK DRUVE,
ISABEL FISK.